(12) United States Patent
Sah et al.

(10) Patent No.: US 9,841,837 B2
(45) Date of Patent: Dec. 12, 2017

(54) APPARATUS AND METHOD FOR RECOGNIZING A USER INPUT

(71) Applicant: Hyundai Motor Company, Seoul (KR)

(72) Inventors: Sung Jin Sah, Suwon-si (KR); Kwang Myung Oh, Daejeon (KR); Sung Min Park, Seoul (KR); Hui Sung Lee, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 14/944,946

(22) Filed: Nov. 18, 2015

(65) Prior Publication Data

US 2016/0299621 A1 Oct. 13, 2016

(30) Foreign Application Priority Data

Apr. 8, 2015 (KR) .................. 10-2015-0049786

(51) Int. Cl.
*G06F 3/041* (2006.01)
*G06F 3/043* (2006.01)

(52) U.S. Cl.
CPC ............ *G06F 3/0416* (2013.01); *G06F 3/043* (2013.01)

(58) Field of Classification Search
None
See application file for complete search history.

(56) References Cited

U.S. PATENT DOCUMENTS

| | | | |
|---|---|---|---|
| 2009/0167715 A1 | 7/2009 | Wang et al. | |
| 2014/0079414 A1 | 3/2014 | Amauchi et al. | |
| 2014/0210788 A1 | 7/2014 | Harrison et al. | |
| 2014/0267065 A1 | 9/2014 | Levesque | |
| 2014/0331313 A1* | 11/2014 | Kim | G06F 21/32 726/16 |
| 2016/0085324 A1* | 3/2016 | Schwarz | G06F 3/0416 345/173 |
| 2016/0085333 A1 | 3/2016 | Christopher | |
| 2016/0103493 A1* | 4/2016 | Taninaka | B06B 1/0246 345/173 |
| 2016/0179239 A1* | 6/2016 | Marui | G06F 3/043 345/177 |
| 2016/0259459 A1 | 9/2016 | Yang et al. | |

FOREIGN PATENT DOCUMENTS

| | | |
|---|---|---|
| JP | 2011028555 A | 2/2011 |
| KR | 10-2011-0127526 A | 11/2011 |
| KR | 10-2014-0113119 A | 9/2014 |
| KR | 10-2014-0114766 | 9/2014 |
| KR | 10-1444091 | 9/2014 |

* cited by examiner

*Primary Examiner* — Joseph Haley
*Assistant Examiner* — Emily Frank
(74) *Attorney, Agent, or Firm* — Brinks Gilson & Lione

(57) ABSTRACT

The present disclosure relates to an apparatus and method for recognizing a user input. The apparatus comprises a sensor configured to sense an acoustic wave signal generated by knocking a surface of a medium, an extractor configured to separate an initial pulse signal from the acoustic wave signal and extract signal characteristic of the separated initial pulse signal, and a controller configured to recognize a knocking gesture based on the signal characteristic extracted by the extractor and generate a corresponding control signal.

10 Claims, 6 Drawing Sheets

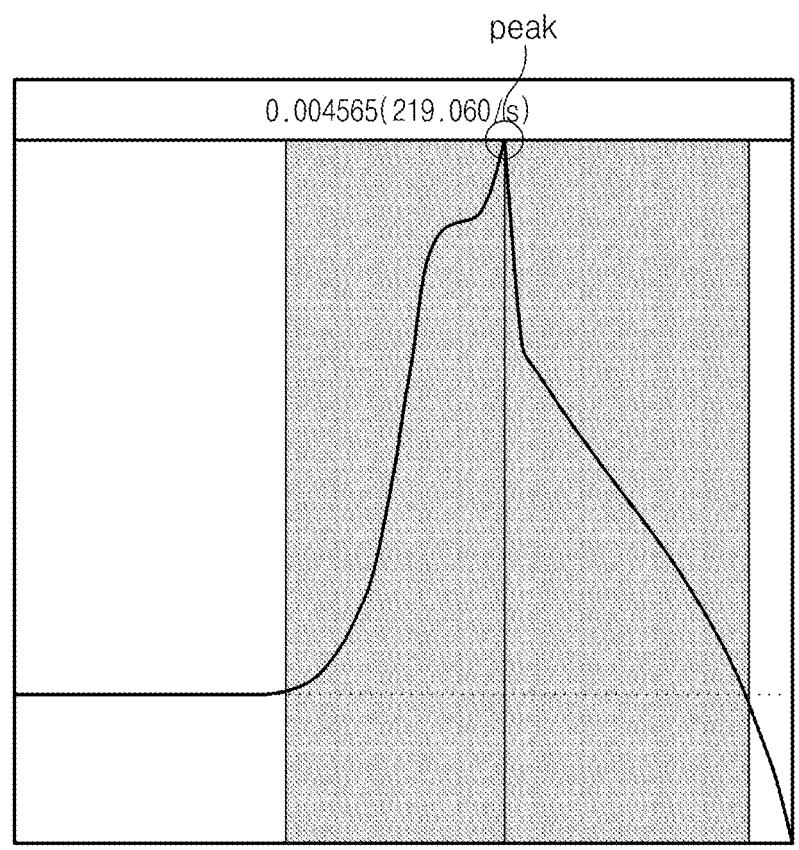
F I G. 2B

APPARATUS AND METHOD FOR RECOGNIZING A USER INPUT

CROSS-REFERENCE TO RELATED APPLICATION

This application claims the benefit of priority from Korean Patent Application No. 10-2015-0049786, filed on Apr. 8, 2015, the disclosure of which is incorporated herein in its entirety by reference.

BACKGROUND

Field

The present invention relates to an apparatus and method for recognizing a user input to identify a knocking gesture by using the acoustic wave generated when knocking a medium surface.

Description of the Prior Art

The statements in this section merely provide background information related to the present disclosure and may not constitute prior art.

Generally, an input device for inputting data is applied to an electronic apparatus such as a cell phone, a personal digital assistant (PDA), a notebook, a game machine, a navigation, etc. As this input device, a keypad method inputting corresponding data by pressing a key with a finger, and a touch (contact) method such as a touch panel or touch pad inputting corresponding data by lightly touching a contact surface are applied.

The input devices of the keypad method have a problem which can't indefinitely increase the number of keys due to space constraints.

And, since the input devices of the touch method can only be entered in the form of a combination of the presence or absence of a user touch, touch time, or direction, it limits the design of the user interface. Also, if it is applied to the equipment mounted on a vehicle, since the driver has to check the menu displayed on the screen and select the desired menu, it distracts the attention of the driver and so can cause a safety problem while driving.

SUMMARY

The present disclosure is to provide an apparatus and method for recognizing a user input to identify a knocking gesture by analyzing the signal characteristic of the acoustic wave generated when knocking a medium surface.

In order to address the above problems, an apparatus for recognizing a user input is provided. The apparatus comprises: a sensor configured to sense an acoustic wave signal generated by knocking a surface of a medium; an extractor configured to separate an initial pulse signal from the acoustic wave signal and extract signal characteristic of the separated initial pulse signal; and a controller configured to recognize a knocking gesture based on the signal characteristic extracted by the extractor and generate a corresponding control signal.

Also, the medium is a case of a device.

Also, the signal characteristic includes a length and a peak number of the initial pulse signal.

Also, the knocking gesture is a specific part of a finger used to knock the surface of the medium Also, the specific part of the finger includes one of a fingertip, a finger knuckle (joint) and nail.

Also, the controller identifies the knocking gesture as a knocking gesture using a fingertip if the peak number of the initial pulse signal is two.

Also, the controller identifies the knocking gesture as a knocking gesture using a finger knuckle and nail based on a generating peak time of the initial pulse signal if the peak number of the initial pulse signal is one.

On the other hand, a method for recognizing a user input according to an embodiment of the present invention comprises steps of: sensing an acoustic wave signal generated by knocking a surface of a medium; separating an initial pulse signal from the acoustic wave signal; extracting signal characteristic of the initial pulse signal; and recognizing a knocking gesture based on the signal characteristic.

Also, the step of extracting signal characteristic extracts a length and a peak number of the initial pulse signal.

Also, the step of recognizing a knocking gesture comprises the steps of: determining whether the peak number is two; and identifying the knocking gesture as a knocking gesture using a fingertip if the peak number is two.

Also, the step of recognizing a knocking gesture comprises the steps of: determining whether the peak number is one, if the peak number is not two; determining whether a peak generating time of the initial pulse signal satisfies a first condition if the peak number is one; and identifying the knocking gesture as a knocking gesture using a finger knuckle, if the peak generating time satisfies the first condition.

Also, the step of recognizing a knocking gesture further comprises steps of: determining whether the peak generating time satisfies a second condition, if the peak generating time does not satisfies the first condition; and identifying the knocking gesture as a knocking gesture using a nail if the peak generating time satisfies the second condition.

Implementations of the present invention can identify a knocking gesture by analyzing the signal characteristic of the acoustic wave generated when knocking a medium surface.

In addition, implementations of the present invention reflect the physical properties of a knocking medium while using heuristics characteristic and so can reliably classify the knocking gesture.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A to FIG. 2C are graphs showing the signal characteristic depending on parts of a hand when knocking a medium.

DETAILED DESCRIPTION

Hereinafter, the present disclosure will be described in detail with reference to the drawings.

Figure 1:
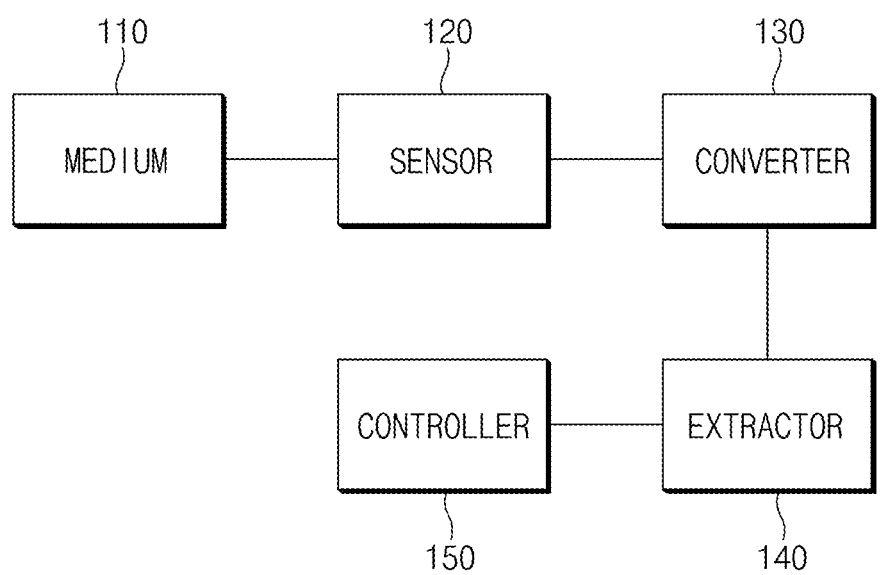
FIG. 1 is a block configuration diagram showing an apparatus for recognizing a user input.

FIG. 1 is a block configuration diagram showing an apparatus for recognizing a user input.

As shown in FIG. 1, an apparatus for recognizing a user input includes a medium 110, a sensor 120, a converter 130, an extractor 140 and a controller 150.

The medium 110 means a case (housing) which surrounds a part of a device. The medium 110 is manufactured through injection molding such as plastic and metal, etc.

The medium 110 receives a knocking gesture of a user. Here, the knocking gesture means a motion to knock the surface of the medium 110 by using a specific part of a user's finger. The specific part includes a fingertip, a finger knuckle (joint) and a nail.

The sensor 120 is attached via an adhesive or a special structure, etc. in the medium 110 and senses (measures) the acoustic wave signal generated by knocking the surface of the medium 110. The sensor 120 includes an acceleration sensor, an acoustic wave sensor (for example, a microphone) and the like.

The converter 130 serves to convert the analog signal measured by the sensor 120 into a digital signal. The converter 130 may be implemented by an analog-to-digital converter (AC-DC Converter).

The extractor 140 processes an acoustic wave signal or a vibration signal. The extractor 140 separates an initial pulse signal from the acoustic wave signal. Here, the initial impulse signal means the first impulse signal of the acoustic wave signal sensed through the sensor 120.

The extractor 140 extracts the signal characteristics by analyzing the initial pulse signal. The signal characteristic includes a length (pulse duration time) and peak number of the initial pulse signal.

The controller 150 recognizes the knocking gesture on the basis of the extracted signal characteristics, and generates and outputs a control signal for controlling the operation of the electrical component (not shown) in accordance with the recognition result. The electrical equipment (not shown) operates in response to a control signal output from the controller 150. The electrical equipment (not shown) may be a navigation, audio, radio and the like.

The controller 150 determines (recognizes) as the knocking gesture using a fingertip if the peak number of the initial pulse signal is two.

On the other hand, the controller 150 classifies the knocking gesture according to the time when the peak is generated if the peak number of the initial pulse signal is one. The controller 150 identifies the knocking gesture as a knocking gesture using a finger knuckle if the time when the peak of the initial pulse signal is generated satisfies a first condition. And, the controller 150 identifies the knocking gesture as a knocking gesture using a nail if the time when the peak of the initial pulse signal is generated satisfies a second condition.

Figure 2A:
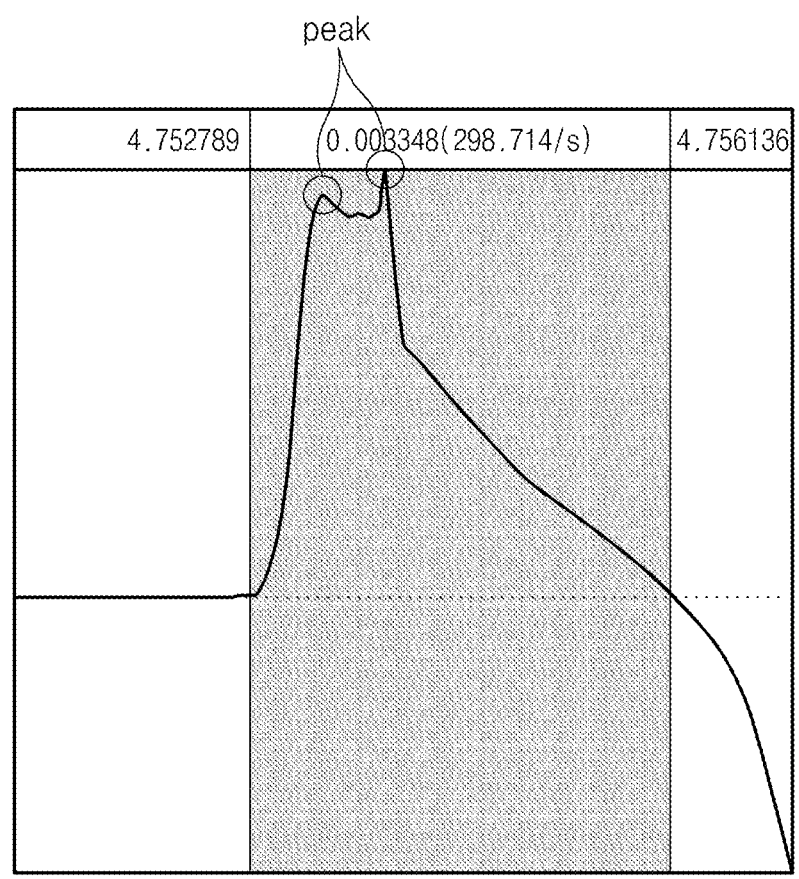
Figure 2C:
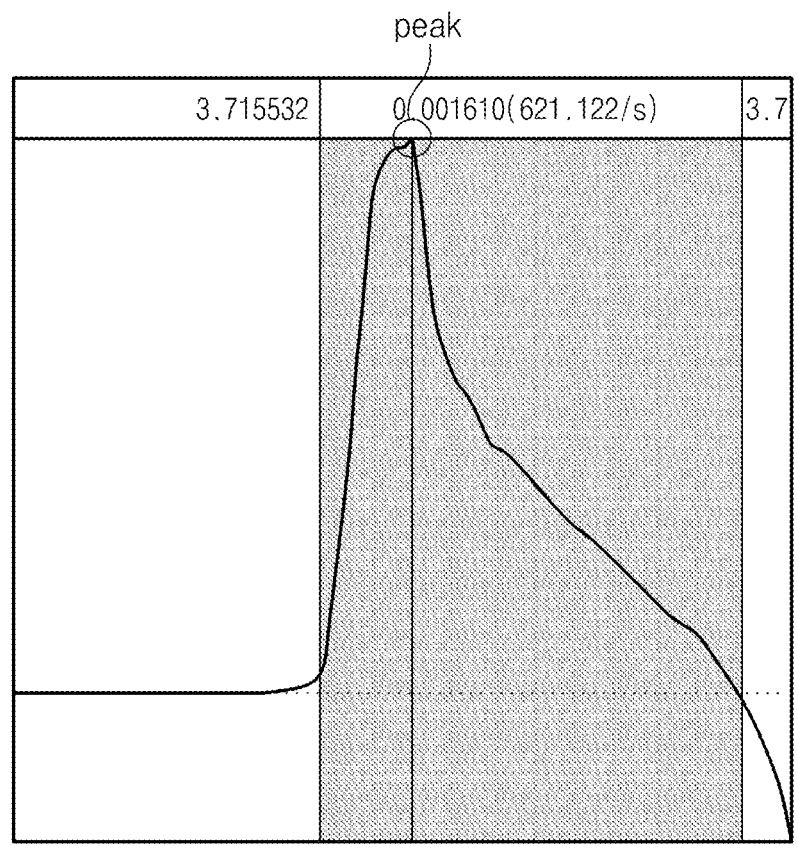

FIG. 2A to FIG. 2C are graphs showing the signal characteristic depending on parts of a hand when knocking a medium.

The signal characteristic depending on the part of a hand is generated in the early period of the total signal.

Referring to FIG. 2A, the properties of the flesh and bones of the fingertip are shown in sequence when knocking by a fingertip. Since the flesh of the finger is thicker than other part and the flesh has viscoelastic properties, the length of the first signal is relatively long and the signal peak of the beginning of the initial signal is rounded. Since then, a sharp peak appears due to a finger bone characteristic.

When the finger knuckle knocks the medium, as shown in FIG. 2B, the finger knuckle does not include much flesh than the fingertip, and the characteristic of the bone appears larger than the finger. The viscoelastic property by the flesh appears weak at the beginning, and the acoustic/vibration component becomes a major component and so a sharp peak appears. The length of the first signal is relatively short in comparison with the fingertip.

When knocking the medium by a nail, the nail has no flesh and hard contact is major contact. Thus, as shown in FIG. 2C, the viscoelastic characteristic does not appear, the signal is generally sharp and the length of the first signal is very short.

The present disclosure determines the knocking gesture by using the length of the signal and the peak number of the signal.

Figure 3:
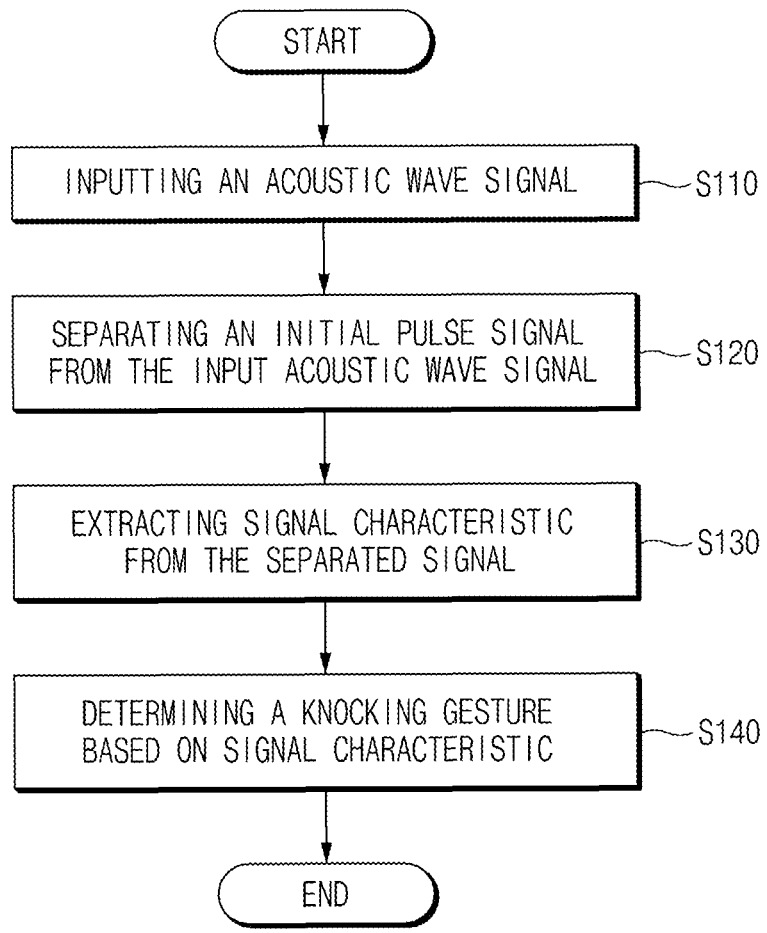
FIG. 3 is a flow chart showing a method for recognizing a user input.
Figure 4:
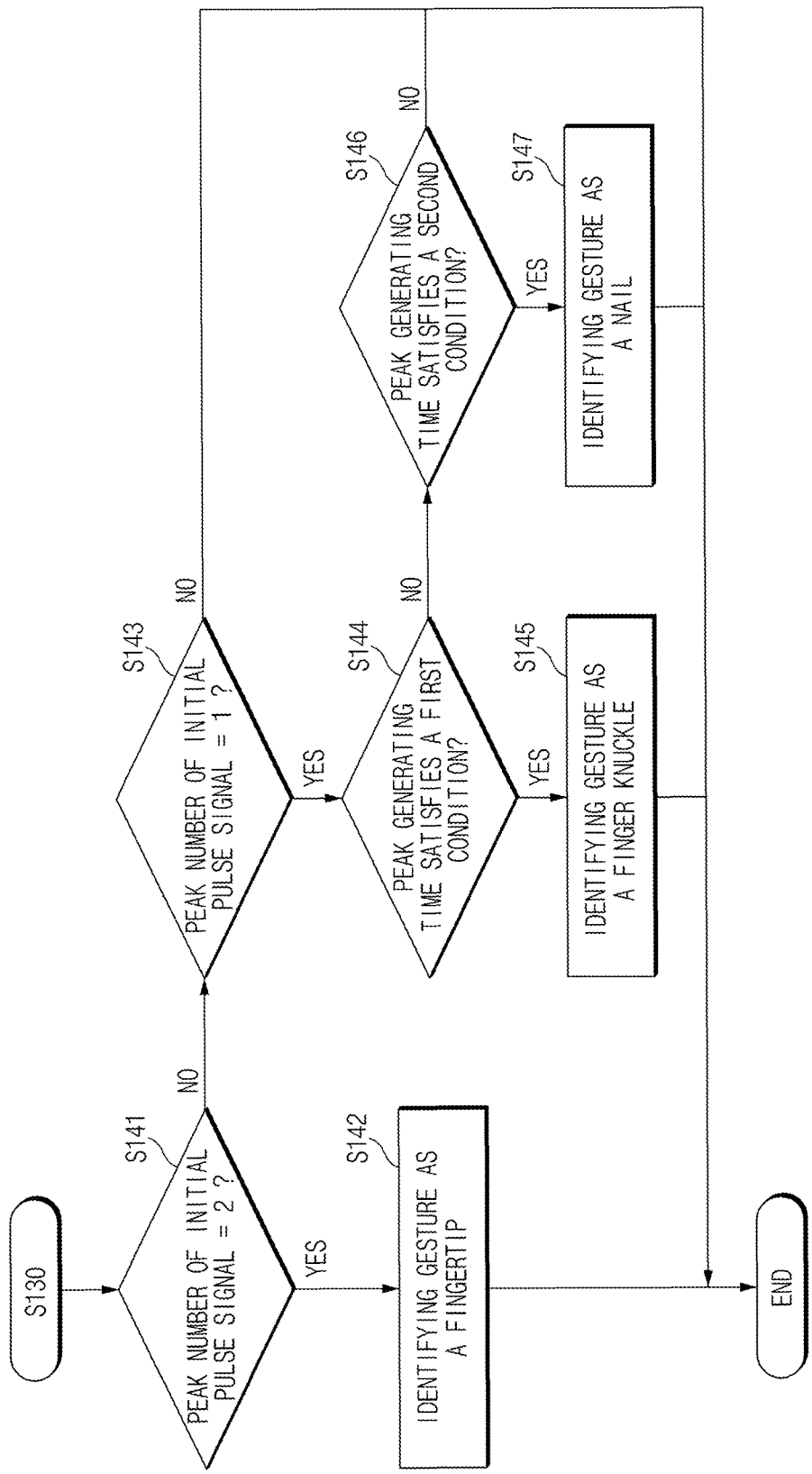
FIG. 4 is a flow chart showing a process for determining a knocking gesture shown in FIG. 3.

FIG. 3 is a flow chart showing a method for recognizing a user input, and FIG. 4 is a flow chart showing a process for determining a knocking gesture shown in FIG. 3.

Referring to FIG. 3, firstly, an apparatus for recognizing a user input receives an acoustic wave signal generated by a knocking gesture on the surface of the medium 110 through the sensor 120 (S110). For example, if a user knocks the surface of the medium 110 using a specific part of a finger, the sensor 120 measures the acoustic wave signal generated by knocking the surface of the medium 110.

The extractor 140 of the apparatus for recognizing a user input separates an initial pulse signal from the input (sensed) acoustic wave signal (S120). The extractor 140 receives the acoustic wave signal measured by the sensor 120, and separates a first pulse signal from the received acoustic wave signal. At this time, the converter 130 converts the acoustic wave signal input from the sensor 120 to a digital signal and outputs it to the extractor 140.

The extractor 140 extracts the signal characteristic from the separated signal (S130). Here, the signal characteristic includes the length (duration time) and the peak number of the initial pulse signal.

The controller 150 of a user input apparatus determines (recognizes) the knocking gesture based on the signal characteristic extracted by the extractor 140 (S140).

Next, knocking gesture determination process will be described in more detail.

The controller 150 determines whether the peak number of the initial pulse signal is two (S141). The controller 150 identifies the knocking gesture as a knocking gesture using a fingertip if the peak number is two (S142).

On the other hand, if the peak number of the initial pulse signal is not two in step S141, the controller 150 determines whether the peak number of the initial pulse signal is one (S143).

The controller 150 classifies the knocking gesture depending on the time which the peak is generated, if the peak number of the initial pulse signal is one. Here, the peak generating time (peak time) is represented by the ratio of the time (the duration time of the initial pulse signal after the peak is generated) from the peak generating time to the ending time of the initial pulse signal compared to the duration time of the initial pulse signal. In this embodiment, the example, which determines the peak generating time by using the ratio of the time from the peak generating time to the ending time of the initial pulse signal compared to the duration time of the initial pulse signal, is described, but it can be also implemented to use the ratio of the time from the starting time of the initial pulse signal to the peak generating time compared to the duration time of the initial pulse signal.

The controller 150 determines whether the peak generating time of the initial pulse signal satisfies a first condition (S144). For example, the controller 150 determines whether the peak generating time is less than 0.6%.

The controller 150 identifies the knocking gesture as a knocking gesture using a finger knuckle if the peak generating time of the initial pulse signal satisfies the first condition (S145).

The controller 150 determines whether the peak generating time of the initial pulse signal satisfies a second condition, if the peak generating time of the initial pulse signal does not satisfies the first condition (S146). For example, the controller 150 determines whether the peak generating time is more than 0.8%.

The controller 150 identifies the knocking gesture as a knocking gesture using a nail if the peak generating time of the initial pulse signal satisfies the second condition (S147).

Then, the controller 150 generates the control signal corresponding to the recognized knocking gesture and transmits it to the corresponding electrical component (not shown).

In the above description, the present invention has been described through the preferred embodiments and the applications, but the present invention is not limited to the embodiments and application, and various modifications can be made by those skilled in the art without departing from the gist of the present invention, and these modifications will be not to be understood individually from the technical spirit or prospect of the present invention.

What is claimed is:

1. An apparatus for recognizing a user input, the apparatus comprising:
   a sensor configured to sense an acoustic wave signal;
   an extractor configured to:
      separate an initial pulse signal from the acoustic wave signal; and
      extract a signal characteristic from the separated initial pulse signal, wherein the initial pulse signal includes a first impulse signal in the acoustic wave signal, and wherein the signal characteristic includes a length of the initial pulse signal and a number of peaks included in the initial pulse signal; and
   a controller configured to:
      recognize a knocking gesture based on the signal characteristic extracted by the extractor; and
      generate a corresponding control signal.

2. The apparatus of claim 1, wherein the medium is a case of a device.

3. The apparatus of claim 1, wherein the knocking gesture originates from a specific part of a finger used to knock a surface of a medium.

4. The apparatus of claim 3, wherein the specific part of the finger is one of a fingertip, a finger knuckle (joint), or a nail.

5. The apparatus of claim 1, wherein the controller identifies the knocking gesture as a knocking gesture using a fingertip when the initial pulse signal includes two peaks.

6. The apparatus of claim 1, wherein the controller identifies the knocking gesture as a knocking gesture using a finger knuckle and nail based on a generating peak time of the initial pulse signal when the initial pulse signal includes one peak.

7. A method for recognizing a user input, the method comprising:
   sensing an acoustic wave signal;
   separating an initial pulse signal from the acoustic wave signal;
   extracting a signal characteristic of the initial pulse signal, wherein the initial pulse signal includes a first impulse signal in the acoustic wave signal, and wherein the signal characteristic includes a length of the initial pulse signal and a number of peaks included in the initial pulse signal; and
   recognizing a knocking gesture based on the signal characteristic.

8. The method of claim 7, wherein recognizing the knocking gesture comprises:
   determining whether the peak number is two; and
   identifying the knocking gesture as a knocking gesture using a fingertip when the peak number is two.

9. The method of claim 8, wherein recognizing the knocking gesture comprises:
   determining whether the peak number is one, when the peak number is not two;
   determining whether a peak generating time of the initial pulse signal satisfies a first condition when the peak number is one; and
   identifying the knocking gesture as a knocking gesture using a finger knuckle, when the peak generating time satisfies the first condition.

10. The method of claim 9, wherein recognizing the knocking gesture further comprises:
    determining whether the peak generating time satisfies a second condition, when the peak generating time does not satisfies the first condition; and
    identifying the knocking gesture as a knocking gesture using a nail when the peak generating time satisfies the second condition.

* * * * *